United States Patent [19]

Rose et al.

[11] 4,090,448
[45] May 23, 1978

[54] FERROELECTRIC PULSED POWER SOURCE

[75] Inventors: Millard F. Rose, Dahlgren; John A. Mazzie, Fredericksburg, both of Va.

[73] Assignee: The United States of America as represented by the Secretary of the Navy, Washington, D.C.

[21] Appl. No.: 213,760

[22] Filed: Dec. 29, 1971

[51] Int. Cl.$^2$ ............................................. F42B 5/08
[52] U.S. Cl. ........................... 102/70.2 GA; 310/339; 307/106
[58] Field of Search ............... 102/70.2 GA; 310/8.7, 310/8.3; 307/106

[56] References Cited

U.S. PATENT DOCUMENTS

| | | | |
|---|---|---|---|
| 2,972,306 | 2/1961 | Kabik et al. | 102/70.2 GA |
| 3,106,161 | 10/1963 | Wallbaum et al. | 102/70.2 GA |
| 3,320,890 | 5/1967 | Ciccone et al. | 102/70.2 GA |
| 3,339,090 | 8/1967 | Jaffe et al. | 102/70.2 GA |
| 3,523,202 | 8/1970 | Maire | 310/8.7 |

*Primary Examiner*—Nelson Moskowitz

[57] ABSTRACT

A high power one-shot pulse generator comprised of a pressure chamber, crystals sandwiched between electrodes and a spark gap. Pressure exerted on one of the electrodes, acting as a pusher plate, creates a net potential difference across the spark gap which discharges when the potential reaches the breakdown voltage the spark gap has been set for. Pressure is created by initiating a combustible material to produce high pressure gases in the pressure chamber.

2 Claims, 3 Drawing Figures

FERROELECTRIC PULSED POWER SOURCE

BACKGROUND OF THE INVENTION

This invention relates generally to pulse generators, and more particularly to high power one-shot pulse generators which produce a wide range of high power pulses in the megawatt power range. This high power one shot pulse generator is useful in such areas as a rf power source, a flash x-ray power source and in communications and any application demanding a compact one shot power source.

Efforts to produce high power pulse generators have not been entirely successful in the past. Prior art devices either suffer from the disadvantage of not producing sufficient energy or on the other hand if they produce high energy outputs they are relatively uncontrolled and inefficient. One such device produces a high power output by explosively loading a piezoelectric crystal which results in high power short duration pulses. In this device great care must be taken to ensure a planar pulse with magnitude less than that which gives dielectric breakdown. A further disadvantage of this device is that explosives are hazardous and dangerous to handle. Another method of producing high power pulse generators is to apply pressure to a crystal by hydraulic presses. This method can produce high voltages but suffers the disadvantage of being large, heavy and limited in peak pressure obtainable. It is also a relatively low energy device.

SUMMARY OF THE INVENTION

The general purpose of this device is to produce an efficient high power one shot electrical pulse generator in which the voltage-time, current-time profiles can be controlled. The invention produces a high power output by forming high pressure gases in the chamber adjacent to a crystal mounted between two electrodes. The pressure in the pressure chamber is generated by igniting a thermite material in the presence of a liquid or gaseous medium. Heat energy is added to the liquid or gaseous medium which in turn produces a pressure on the electrode next to the crystal which is adjacent to the pressure chamber. The net potential difference produced by the pressure on the crystal also produces a net potential difference across a spark gap connected to the crystal by a second electrode. When the net potential difference reaches the breakdown voltage the spark gap has been set for the spark gap becomes conductive and discharges. If the application of pressure is continued, the process would repeat itself until the maximum pressure the device is capable of generating is reached. The function of the spark gap is thus to hold off the pulse and to determine the maximum voltage per pulse. The rate of loading is controlled by controlling the rate at which the combustible thermite material adds heat energy to the system. This includes mixing slow burning substances with the thermite, increasing or decreasing the amount of thermite present, and increasing or decreasing the amount of gaseous or liquid medium present.

It is therefore an object of this invention to provide an improved high power one shot electrical pulse generator.

It is a further object of the present invention to provide a high power one shot pulse generator in which the maximum voltage per pulse can be controlled.

A still further object of the present invention is to provide a high power one shot electrical pulse generator in which the rate of loading can be accurately controlled.

Other objects, advantages and novel features of the invention will become apparent from the following detailed description of the invention when considered in conjunction with the accompanying drawings.

DETAILED DESCRIPTION OF THE PREFERRED EMBODIMENTS

Figure 1:
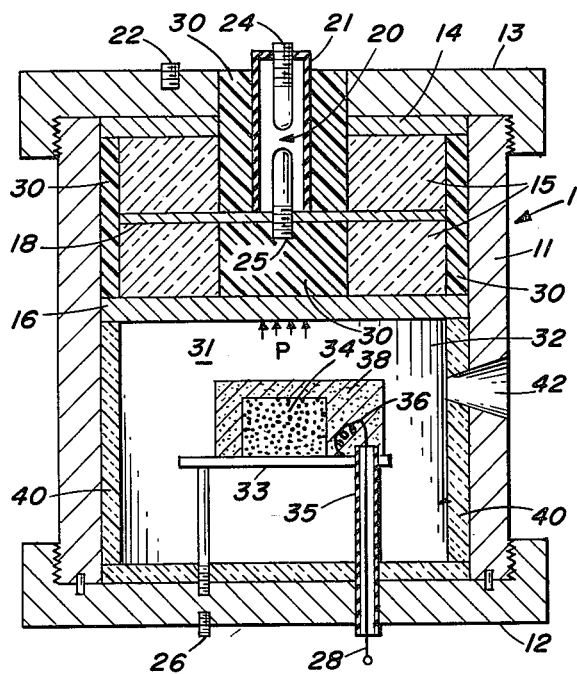
FIG. 1 illustrates a high power electrical pulse generator utilizing a single spark gap.

Referring now to the drawings wherein like reference numerals designate identical or corresponding parts throughout the several views, and more particularly to FIG. 1 there is shown a high power one shot pulse generator comprised of ferroelectric-piezoelectric materials 15, such as Barium Titanate and PZT enclosed in a high strength cylindrical container 10 as shown. The container 10 is formed of a cylindrical housing 11 and end caps 12 and 13. The ferroelectric-piezoelectric materials 15 are crystal rings mounted between electrodes 14, 16 and 18 with electrodes 14 and 16 connected to the case 10 and the third electrode 18 brought out through an adjustable spark gap 20. The spaces between the crystals 15 and between the crystals 15 and the case wall 11 are potted with a non-conducting epoxy potting compound 30 having high dielectric breakdown strength and a high compressive yield strength. The spark gap 20 is comprised of a non-conducting mounting structure 21 which supports electrode 24 while the other electrode 25 of the spark gap is connected to the electrode 18. The spark gap 20 can be varied by adjusting electrode 24.

A pressure chamber 32 is formed in the cylindrical container 10 by electrode 16, end cap 12 and housing 11. Pressure is generated in the chamber by combustion of thermite pellets 34 surrounded by a suitable ignition mixture 38 which is immersed in a pressure transmitting medium 31 which can be either a gas or a liquid such as water, air, or other specific gas confined in the pressure chamber 32. The pressure chamber 32 is thermally insulated by a suitable material 40 to reduce heat losses and ensure maximum absorption of energy by the pressure transmitting medium 31. A small vent hole 42 in the case 11 prevents rupture of the case and limits the maximum pressure obtainable. Combustion of the ignition mixture 38 and the thermite pellets 34 is initiated by using a heater wire 36. Terminals 26 and 28 provide connecting points for the heater wire 36 to an external battery. Terminal 28 is insulated from the container 10 by the tube 35 of insulating material. Terminal 22 along with the spark gap electrode 24 provides the output.

In operation pressure is generated in the pressure chamber 32 by one of several methods, all of which form high pressure gases in times on the order of seconds or less. Such a loading rate is desirable in order to have a high pulse repetition rate and to minimize losses due to stray discharge effects. In one method, the pressure transmitting medium 31 is confined in the pressure chamber and thermite pellets 34 immersed in the medium 31. Heat energy is then added to the medium 31 by the thermite reaction which is electrically initiated using a heater wire 36 and ignition mixture 38. As the medium 31 is heated, it expands, or vaporizes if a liquid, and exerts a pressure, shown at P, on electrode 16 which in turn transmits the pressure to the crystals 15. Electrode 16 thus also serves as a pusher plate and must have a high compressive yield strength. The rate of loading is controlled by controlling the rate at which thermite adds heat energy to the system. This includes mixing slow burning substances with the thermite, increasing or decreasing the amount of thermite present and increasing or decreasing the amount of medium 31 present. A number of thermite materials suitable for use are well known and readily available such as finely divided aluminum and a metallic oxide as iron, chromium or manganese oxide.

In another method of pressure generation, a propellant or powder is substituted for the thermite pellets 34 and electrically ignited as before. As the propellent or powder burns, a large quantity of gas is produced, and this gas acting in conjunction with the medium 31 (in this case air or if desired a suitable liquid such as water) similarly exerts a pressure on electrode 16.

As pressure P is applied to the crystals 15 by the electrode 16, potential differences develop between one set of the electrodes (16 and 18) and the other set (14 and 18), so that a net difference of potential exists across the spark gap 20. When this difference of potential reaches the breakdown voltage that the spark gap has been set for, the spark gap becomes conducting and discharges. If this application of pressure is continued, the process will repeat itself until the maximum pressure that the device is capable of generating is reached. When the peak pressure begins to dissipate itself, the device unloads and the same cycle then occurs again. The pulse repetition rate will be a function of the rate-of-pressure-loading and of the spark gap electrode spacing. The function of the spark gap 20 is thus to hold off the pulse and to determine the maximum voltage per pulse. Terminals 22 and 24 provide the connection points feeding the pulses to external circuitry.

Figure 2:
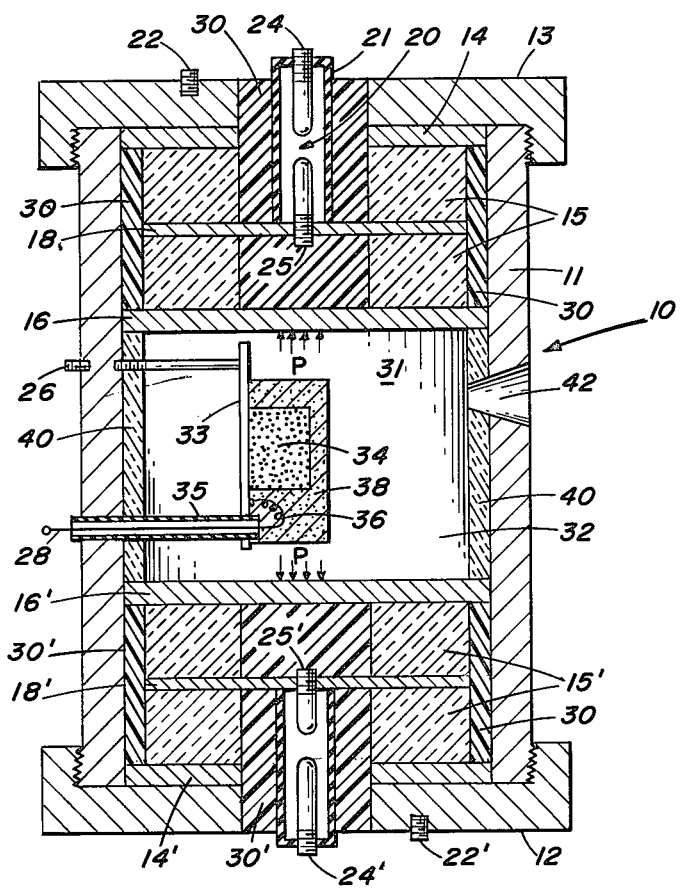
FIG. 2 shows another embodiment of the high power one shot electrical pulse generator utilizing two spark gaps.

FIG. 2 illustrates an alternate embodiment in which like numerals identify like parts of FIG. 1. In this embodiment an additional set of crystal rings 15' are placed at the bottom of the cylindrical container 10 and the pressure chamber 32 is contained in the center of the cylinder between electrodes 16 and 16'. Pressure is generated in the same manner as described for the original device, but a pulse is developed not only on terminals 22 and 24 but on 22' and 24' as well. Two sets of pulses therefore are available which are separately adjustable as to the maximum voltage per pulse by means of the separate spark gaps. The connection of both of these pulse terminals in parallel would enable more power to be delivered by the device to external circuitry.

Figure 3:
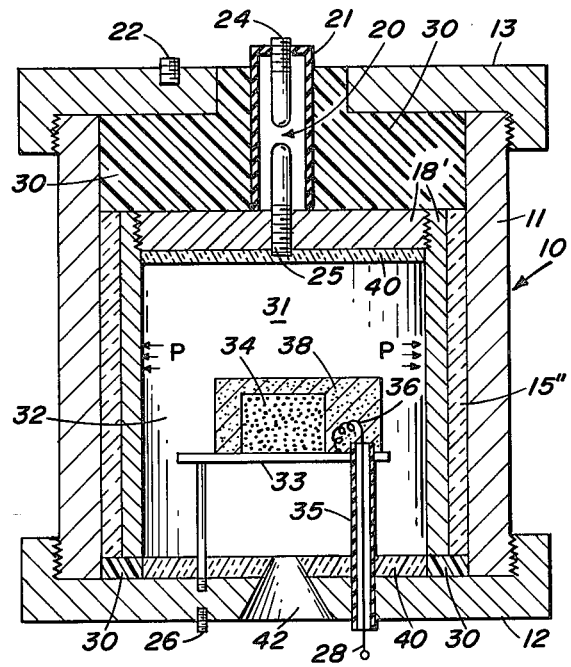
FIG. 3 shows another embodiment of the high power one shot electrical pulse generator in which a cylindrical crystal is used.

Another alternate embodiment is shown in FIG. 3 in which like numerals indentify like parts of FIG. 1. In this embodiment a long cylindrical crystal 15" is used with the case 11 serving as both electrodes 14 and 16, and the pressure is applied to electrode 18'. The pressure chamber 32 is thus in the interior of, and surrounded by, the hollow cylindrical crystal 15" so that the pressure P is applied to a very large surface area. Other alternative methods of construction are also possible. For example in the original device of FIG. 1 flat, solid crystals could be used instead of the crystal rings. Also any chemical reaction capable of producing a large amount of heat energy or gaseous products in one or two seconds or less could be used within the pressure chamber.

Thus there has been disclosed an improved high power one shot pulse generator with a more reliable output. Obviously many modifications and variations of the present invention are possible in light of the above teachings.

What is claimed is:

1. A high power pulse generator comprising:
   a cylindrical container;
   a cylindrical piezoelectric crystal disposed within said container and having the exterior surface thereof in electrical contact with the interior surface of said container;
   a hollow cylindrical electrode disposed within said crystal in electrical contact therewith and insulated from said container;
   spark gap means disposed in and closing one end of said container, said spark gap means being insulated from said container and having one side thereof electrically connected to said cylindrical electrode;
   means for electrically connecting the other side of said spark gap and said container to a load;
   an end cap secured to the other end of said container, and insulated from said cylindrical electrode, to define a pressure chamber within said hollow cylindrical electrode; and
   combustible means for rapidly generating a pressure of predetermined magnitude and duration within said pressure chamber whereby radially acting forces will suddenly compress said piezoelectric crystal between said cylindrical electrode and said container to create a potential difference across said spark gap and a resulting high power pulse when the breakdown voltage is reached.

2. The pulse generator of claim 1 wherein said spark gap is adjustable whereby the breakdown voltage may be varied.

* * * * *